US007616689B2

(12) United States Patent

Bjøntegaard

(10) Patent No.: US 7,616,689 B2

(45) Date of Patent: Nov. 10, 2009

(54) CALCULATION OF INTERPOLATED PIXEL VALUES

(75) Inventor: Gisle Bjøntegaard, Oppegård (NO)

(73) Assignee: Tandberg Telecom AS, Lysaker (NO)

( * ) Notice: Subject to any disclaimer, the term of this patent is extended or adjusted under 35 U.S.C. 154(b) by 485 days.

(21) Appl. No.: 10/954,195

(22) Filed: Oct. 1, 2004

(65) Prior Publication Data

US 2005/0123040 A1 Jun. 9, 2005

(30) Foreign Application Priority Data

Dec. 5, 2003 (NO) ................................ 20035444

(51) Int. Cl.

| | |
|---|---|
| ***H04N 7/12*** | (2006.01) |
| ***H04N 11/02*** | (2006.01) |
| ***H04N 11/04*** | (2006.01) |
| ***H04B 1/66*** | (2006.01) |

(52) U.S. Cl. ................................................ 375/240.12

(58) Field of Classification Search ............. 375/240.12
See application file for complete search history.

(56) References Cited

U.S. PATENT DOCUMENTS

| | | | | |
|---|---|---|---|---|
| 5,638,128 | A * | 6/1997 | Hoogenboom et al. | 375/240.15 |
| 5,870,497 | A | 2/1999 | Galbi | |
| 5,936,672 | A * | 8/1999 | Ahnn | 375/240.17 |
| 6,259,734 | B1 | 7/2001 | Boon | |
| 6,288,745 | B1 | 9/2001 | Okuno | |
| 6,510,178 | B1 | 1/2003 | Fimoff | |
| 6,570,616 | B1 | 5/2003 | Chen | |
| 6,628,714 | B1 | 9/2003 | Fimoff | |
| 6,658,157 | B1 | 12/2003 | Satoh | |
| 2004/0213470 | A1* | 10/2004 | Sato et al. | 382/239 |
| 2004/0240550 | A1* | 12/2004 | Suzuki | 375/240.16 |
| 2004/0264565 | A1* | 12/2004 | MacInnis | 375/240.01 |

FOREIGN PATENT DOCUMENTS

| | | |
|---|---|---|
| EP | 0294958 | 8/1995 |
| EP | 1081937 | 3/2001 |
| EP | 1313312 | 5/2003 |

* cited by examiner

*Primary Examiner*—Nhon T Diep

(74) *Attorney, Agent, or Firm*—Birch, Stewart, Kolasch & Birch, LLP

(57) ABSTRACT

The invention is related to video compression systems, and in particular to compression/decompression in digital video systems. The present invention discloses an alternative method to calculate values of interpolated pixel positions in a video picture.

9 Claims, 2 Drawing Sheets

A' E'

A'

| A | b | c | d | E |
|---|---|---|---|---|
| f | g | h | i | j |
| k | l | m | n | o |
| p | q | r | s | t |
| U | v | w | x | Y |

A' E'

A' g=(c+k)/2

A B c d E
f g h i j
~~k~~ l m n o
p q r s t
U v w x Y (a)

i=(c+o)/2

A ~~b~~ c d E
f g h ~~i~~ ~~j~~
k l m n o
p q r s t
U v w x Y (b)

r=(k+Y)/2

A b c d E
f g h i j
~~k~~ l m n o
p q r ~~s~~ t
U v w x ~~Y~~

(c)

s=(w+o)/2

A b c d E
f g h i j
k l m n ~~o~~
p q r ~~s~~ t
U v ~~w~~ x Y (d)

m=(E+U)/2

A b c d ~~E~~
f g h i j
p q r s t (e)

CALCULATION OF INTERPOLATED PIXEL VALUES

FIELD OF THE INVENTION

The invention is related to video compression systems, and in particular to compression/decompression of digital video systems.

BACKGROUND OF THE INVENTION

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed-video data results in large bit volumes, and cannot be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards, all of which using block based prediction from previously encoded and decoded pictures.

The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors.

In a typical video sequence, the content of a present block M would be similar to a corresponding block in a previously decoded picture. If no changes ha-se occurred since the previously decoded picture, the content of M would be equal to a block of the same location in the previously decoded picture. In other cases, an object in the picture may have been moved so that the content of M is more equal to a block of a different location in the previously decoded picture. Such movements are represented by motion vectors (V). As an example, a motion vector of (3; 4) means that the content of M has moved 3 pixels to the left and 4 pixels upwards since the previously decoded picture.

A motion vector associated with a block is determined by executing a motion search. The search is carried out by consecutively comparing the content of the block with blocks in previous pictures of different spatial offsets. The offset relative to the present block associated with the comparison block having the best match compared with the present block, is determined to be the associated motion vector.

In H.262, H.263, MPEG1, MPEG2 the same concept is extended so that motion vectors also can take ½ pixel values. A vector component of 5.5 then imply that the motion is midway between 5 and 6 pixels. More specifically the prediction is obtained by taking the average between the pixel representing a motion of 5 and the pixel representing a motion of 6. This is called a 2-tap filter due to the operation on 2 pixels to obtain prediction of a pixel in between. Motion vectors of this kind are often referred to as having fractional pixel resolution or fractional motion vectors. All filter operations can be defined by an impulse response. The operation of averaging 2 pixels can be expressed with an impulse response of (½, ½) Similarly, averaging over 4 pixels implies an impulse response of (¼, ¼, ¼, ¼).

SUMMARY OF THE INVENTION

An object of the present invention is to provide a method in video coding and decoding for calculating values for interpolated pixel positions located between integer pixel positions in a video picture, which overcomes or reduces drawbacks of the prior art.

A particular object of the present-invention is to provide such a method which requires less computational capacity, whilst maintaining or improving performance and quality.

To achieve the above and further objects, the present invention provides a method in video coding and decoding for calculating pixel values for interpolated pixel positions located between integer pixel positions in a video picture, wherein pixel values for a set of interpolated pixel positions being horizontally or vertically lined up with integer-pixel positions are calculated by applying a first discrete filter on associated horizontally or vertically lined up interpolated pixel positions, and wherein a pixel value for an interpolated, first pixel position no being horizontally or vertically lined up with integer pixel positions is calculated by applying a second discrete filter on a second and a third pixel positions, said second and third pixel positions being integer pixel positions or interpolated pixel positions that are lined up with said interpolated, first pixel position.

In an advantageous embodiment, the second discrete filter is a 2-tap filter.

In an advantageous embodiment, the first discrete filter is a symmetric 6-tap filter.

The second discrete 2-tap filter is advantageously a symmetric 2-tap filter averaging the pixel values of said second and third pixel positions.

Advantageously, the second and third pixel positions are localized on each respective side of, and with same distance relative to, the first interpolated pixel position.

Any one of the above embodiments of the method may advantageously be used in a pixel motion compensation process according to the coding standard H.264/AVC.

BRIEF DESCRIPTION OF THE DRAWINGS

A better appreciation of the present invention will be obtained by reference to the following detailed description and the accompanying drawings, wherein.

DETAILED DESCRIPTION OF THE PRESENT INVENTION

In the following, the present invention will be discussed by describing a preferred embodiment. However, a person skilled in the art will realize other applications and modifications within the scope of the invention as defined in the enclosed independent claim.

A new video compression standard has recently been developed as a joint effort between ITU and ISO/IEC. The formal titles of the common standard in the two standardization bodies are: "ITU-T Recommendation H.264" and "ISO/IEC MPEG-4 (Part 10) Advanced Video Coding". In the following this common standard will be referred to as H.264/AVC.

Figure 1:
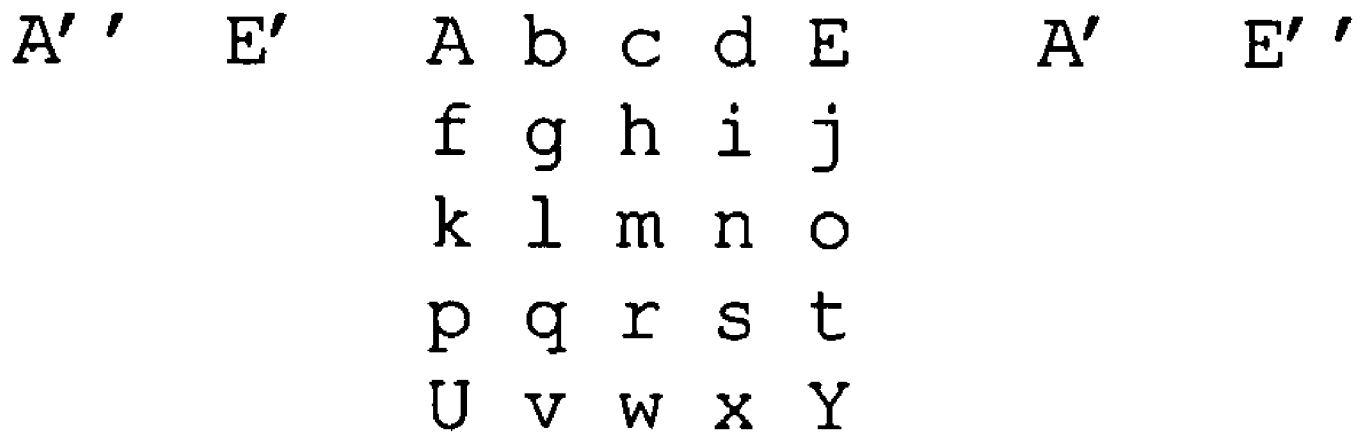
FIG. 1 illustrates an example of integer- and fractional pixel positions according to the H.264/AVC standard.

FIG. 1 illustrates an example of integer- and fractional pixel positions according to the H.264/AVC standard.

In H.264/AVC coding methods have improved both in terms of motion resolution and number of pixels used for each interpolation. The methods use motion compensated prediction with up to ¼ pixel accuracy. Even ⅛ pixel accuracy is defined, but not included in any profile. An example of integer and fractional pixel positions are indicated in FIG. 1. For simplicity, interpolations are only shown between the positions A, E, U and Y).

The positions A, E, U, and Y indicate integer pixel positions. The positions A", E', A' and E" indicates additional integer positions on the A-E line.

The positions c, k, m, o, and w indicate half pixel positions. The interpolated values in these positions may be obtained by e.g. using a 6-tap filter with impulse response (1/32, −5/32, 20/32, 20/32, −5/32, 1/32) operating on integer pixel values. As an example, c is then calculated by the following expression:

$$c=\tfrac{1}{32}\cdot A''-\tfrac{5}{32}\cdot E+\tfrac{20}{32}\cdot A+\tfrac{20}{32}\cdot E-\tfrac{5}{32}\cdot A'+\tfrac{1}{32}\cdot E''$$

The filter is operated horizontally or vertically as appropriate. Further, to obtain the value for m, the filter is not operated on integer values, but on already interpolated values in the other direction. The remaining positions in the square depicted above are obtained by averaging respective integer- and half neighbor pixel positions (2 tap filter):

$$b=(A+c)/2,\ d=(c+E)/2,\ f=(A+k)/2,\ g=(c+k)/2,\ h=(c+m)/2,\ j=(c+o)/2,\ j=(E+o)/2$$

$$l=(k+m)/2,\ n=(m+o)/2,\ p=(U+k)/2,\ q=(k+w)/2,\ r=(m+w)/2,\ S=(w+o)/2,\ t=(Y+o)/2$$

$$v=(U+w)/2,\ X=(w+Y)/2$$

As indicated above, the calculation of the position m requires more computational capacity than the other ½ pixel positions since calculations must be performed in 2 directions. When using a 6-tap filter for calculation of 1 positions as described above, 6-tap filter operations are first applied in the horizontal direction to derive the ½ pixel positions in the vertical line of m, and then these positions are subjected to a 6-tap filter operation in the vertical direction to determine the value of m (or vice versa). This double 6-tap operation is unique for the position of m in a 2×2 block, since it is the only ½ pixel position not horizontally or vertically lined up with any integer pixel positions. The required resources to calculate this position are typically more than twice as high as for the other ½ pixel positions. This added complexity is carried further to the calculations of h, l, n, r, which in prior art all depend on the value of m.

The present invention avoids this added complexity by suggesting an alternative deduction of the value of m, and the values of at least some of the ¼ pixel positions. The principals of the present invention are in the following illustrated by an example embodiment. The example uses the same letters to denote the integer positions in a 2×2 block and the associated ½ and ¼ pixel interpolations as earlier in the description.

Assuming now that the ½ pixel positions being horizontally or vertically lined up with integer pixel positions are already calculated. In particular, these positions are denoted c, k, o, and w. They are calculated by means of a 6-tap filter as described above, but other filters and methods of calculation are also applicable.

Instead of applying a full filter operation on ½ pixel positions horizontally or vertically lined up with m, the value of m is calculated by a 2-tap filter operation on two nearby integer pixel positions. In this example, the 2-tap filter operation averages the value of the two positions, i.e. the 2-tap filter has an impulse response of (½, ½). The two nearby positions are found at each opposite side of m. As there are no integer pixel positions lined up either vertically nor horizontally relative to m, the nearest integer pixel positions are found in the diagonal direction, implying the following expression for m:

$$m=(E+U)/2$$

According to the present invention, the involved ¼ pixel positions, i.e. the ¼ pixel positions being derived from m in the prior art, are also derived in a corresponding way so that all pixel positions are calculated directly from A, E, U, Y, c, k, o and/or w. In this way, less intermediate calculation is required to determine the ¼ pixel position values and the special case ½ pixel position. This will reduce the overall complexity of the calculations.

A suggested set of expressions according to the preferred embodiment of the present invention is as follows:

$$b=(A+c)/2,\ d=(c+E)/2,\ f=(A+k)/2,\ g=(c+k)/2,\ h=(A+o)/2,\ i=(c+o)/2,\ j=(E+o)/2$$

$$l=(c+U)/2,\ n=(E+w)/2,\ p=(U+k)/2,\ q=(k+w)/2,\ r=(k+Y)/2,\ s=(w+o)/2,\ t=(Y+o)/2$$

$$V=(w+U)/2,\ x=(Y+W)/2,\ m=(E+U)/2$$

The present invention is not restricted to symmetric 2-taps filters as utilized in the example embodiment described above. The basic principle is to calculate the values of all the ¼ pixel positions and the special case ½ pixel positions by means of inclined filter operations on the integer pixel positions and ½ pixel positions horizontally or vertically lined up with the integer pixel positions. This could be done with the same accuracy as for the prior art calculation by selecting the nearest calculated ½ and/or integer pixel positions, all positioned on the same inclined line as the pixel position to be calculated.

Figure 2:
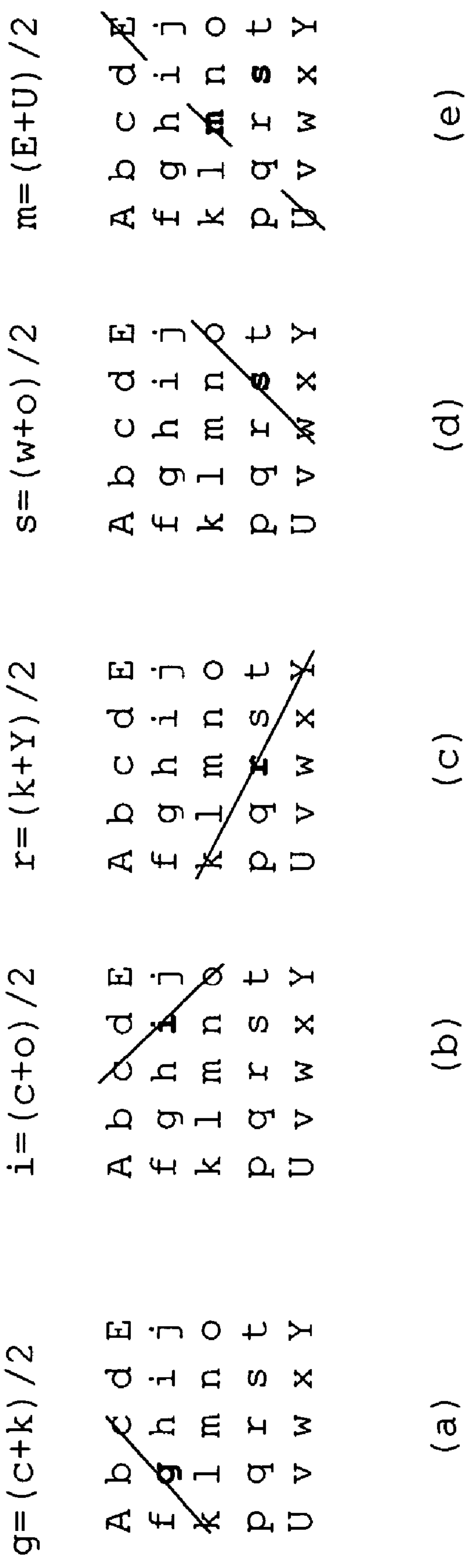
FIG. 2 illustrates examples of integer- and fractional pixel positions wherein values of interpolated pixels are calculated by a method according to the invention.

Illustration of this line is shown in FIG. 2 for some of the expressions of the example embodiment described above. The bold letters indicate which pixel being calculated in each case (a)-(e).

FIG. 2 thus illustrates an example of integer- and fractional pixel positions wherein a value of an interpolated pixel is calculated by a method according to the invention.

In FIG. 2(*a*), the pixel value for the ¼ pixel position illustrated at g is calculated by the expression g=(c+k)/2. The inclined line intersects the ½ pixel position c and the ½ pixel position k.

In FIG. 2(*b*), the pixel value for the ¼ pixel position illustrated at I is calculated by the expression i=(c+o)/2. The inclined line intersects the ½ pixel position c and the ¼ pixel position o.

In FIG. 2(*c*), the pixel value for the ¼ pixel position illustrated at r is calculated by the expression r=(k+Y)/2. The inclined line intersects the ½ pixel position k and the integer pixel position Y.

In FIG. 2(*d*), the pixel value for the ¼ pixel position illustrated at s is calculated by the expression s=(w+o)/2. The inclined line intersects the ½ pixel position w and the ½ pixel position o.

In FIG. 2(*e*), the pixel value for the ½ pixel position illustrated at m is calculated by the expression m=(E+U)/2. the inclined line intersects the integer pixel position E and the integer pixel position U.

Numerous modifications and variations of the present invention are possible based on the above illustrative description. The scope of the invention is defined by the following claims.

The invention claimed is:

1. A method in video coding and decoding for calculating pixel values for interpolated pixel positions located between integer pixel positions in a video picture, wherein pixel values for a set of interpolated pixel positions being horizontally or vertically lined up with integer pixel positions are calculated by applying a first discrete filter on associated horizontally or vertically lined up interpolated pixel positions, said method comprising calculating a pixel value for an interpolated, first pixel position not being horizontally or vertically lined up with integer pixel positions by applying a second discrete filter on a second and third pixel positions, wherein said first pixel position is a ¼ pixel position not being horizontally or vertically lined up with integer pixel positions or a predetermined ½ pixel position not being horizontally or vertically lined up with integer pixel positions and wherein the second and third pixel positions are already calculated ½ pixel positions horizontally or vertically lined up with integer pixel positions or the nearest integer pixel positions diagonally lined up with said ¼ pixel position or said predetermined ½ pixel position.

2. A method according to claim 1, wherein said second discrete filter is a 2-tap filter.

3. A method according to claim 2, wherein said first discrete filter is a symmetric 6-tap filter.

4. A method according to claim 2 or 3, wherein said second discrete 2-tap filter is a symmetric 2-tap filter averaging the pixel values of said second and third pixel positions.

5. A method according to claim 4, wherein said second and third pixel positions are localized on each respective side of, and with same distance relative to, said first interpolated pixel position.

6. Method according to claim 2 or 3, used in a pixel motion compensation process according to the coding standard H.264/AVC.

7. Method according to claim 4, used in a pixel motion compensation process according to the coding standard H.264/AVC.

8. Method according to claim 5, used in a pixel motion compensation process according to the coding standard H.264/AVC.

9. A method according to claim 1, further comprising:

calculating a pixel value for an interpolated, fourth pixel position being horizontally or vertically lined up with integer pixel positions by applying said second discrete filter on a fifth and sixth pixel positions, wherein said fourth pixel position is a ¼ pixel position being horizontally or vertically lined up with integer pixel positions and wherein the fifth and sixth pixel positions are a combination of ½ pixel position being horizontally or vertically lined up with integer pixel positions and an integer pixel position.

* * * * *